US012664397B2

(12) United States Patent
Gravili et al.

(10) Patent No.: US 12,664,397 B2
(45) Date of Patent: Jun. 23, 2026

(54) METHOD FOR DETECTING A WORK OR AGRICULTURAL VEHICLE MISSION THOUGH A NEURAL NETWORK AND CONTROL UNIT IMPLEMENTING THE METHOD

(71) Applicant: CNH Industrial America LLC, New Holland, PA (US)

(72) Inventors: Andrea Gravili, Lecce (IT); Stefano Liberti, Lecce (IT); Costanzo Saracino, Maruggio (IT); Antonio Venezia, Turin (IT); Riccardo Iennaco, Torre Pellice (IT); Michela Palmas, Turin (IT)

(73) Assignee: CNH Industrial America LLC, New Holland, PA (US)

( * ) Notice: Subject to any disclaimer, the term of this patent is extended or adjusted under 35 U.S.C. 154(b) by 965 days.

(21) Appl. No.: 17/571,354

(22) Filed: Jan. 7, 2022

(65) Prior Publication Data

US 2022/0215225 A1     Jul. 7, 2022

(30) Foreign Application Priority Data

Jan. 7, 2021    (IT) ........................ 102021000000242

(51) Int. Cl.
| | |
|---|---|
| *G06N 3/02* | (2006.01) |
| *E02F 3/43* | (2006.01) |
| *E02F 9/26* | (2006.01) |

(52) U.S. Cl.
CPC .............. *G06N 3/02* (2013.01); *E02F 3/431* (2013.01); *E02F 9/264* (2013.01); *G06F 2218/02* (2023.01); *G06F 2218/12* (2023.01)

(58) Field of Classification Search
CPC . G06N 3/02; E02F 3/431; E02F 9/264; G06F 2218/02; G06F 2218/12; A01D 41/141; A01B 71/02
See application file for complete search history.

(56) References Cited

U.S. PATENT DOCUMENTS

| | | | | |
|---|---|---|---|---|
| 10,024,031 B2 * | 7/2018 | Yanagisawa | ............ | E02F 9/128 |
| 2013/0103247 A1 * | 4/2013 | Ogawa | .................... | E02F 9/265 |
| | | | | 701/23 |

(Continued)

FOREIGN PATENT DOCUMENTS

| | | |
|---|---|---|
| EP | 3093400 | 11/2016 |
| GB | 2562121 | 11/2018 |

(Continued)

OTHER PUBLICATIONS

Italy Application No. 202100000242 Search Report, Sep. 14, 2021, 10 pgs.

(Continued)

*Primary Examiner* — Keith D Bloomquist
(74) *Attorney, Agent, or Firm* — Fletcher Yoder, P.C.

(57) ABSTRACT

Method for detecting a work or agricultural vehicle mission through a neural network, wherein the vehicle is provided with an arm including at least two elements wherein one first element is connected to a vehicle frame and one second element is connected to the first element and means to detect a reciprocal degree of freedom between the first element and the frame and between the second element and first element such to assume a plurality of operation configurations, the method including, within an observation time interval, the monitoring of the arm in order detect frequency and time duration for each operation configurations and detecting the vehicle mission as a function of the balance of said frequencies and time durations.

15 Claims, 4 Drawing Sheets

(56) References Cited

U.S. PATENT DOCUMENTS

| | | | |
|---|---|---|---|
| 2016/0078363 A1* | 3/2016 | Hodel | G05B 13/0265 |
| | | | 706/12 |
| 2017/0328031 A1 | 11/2017 | Jang | |
| 2020/0362889 A1 | 11/2020 | Hodel et al. | |
| 2021/0140146 A1* | 5/2021 | Garcia Corrochano | |
| | | | E02F 9/264 |
| 2021/0223774 A1* | 7/2021 | Zhang | G05D 1/0088 |
| 2022/0205221 A1* | 6/2022 | Koga | E02F 9/26 |

FOREIGN PATENT DOCUMENTS

| | | |
|---|---|---|
| JP | 2019163625 | 9/2019 |
| JP | 2020004096 | 1/2020 |
| JP | 2020041326 | 3/2020 |

OTHER PUBLICATIONS

EP Application No. 21217267 Search Report dated May 9, 2022, 9 pgs.

* cited by examiner

F_S(1)
F_S(K)
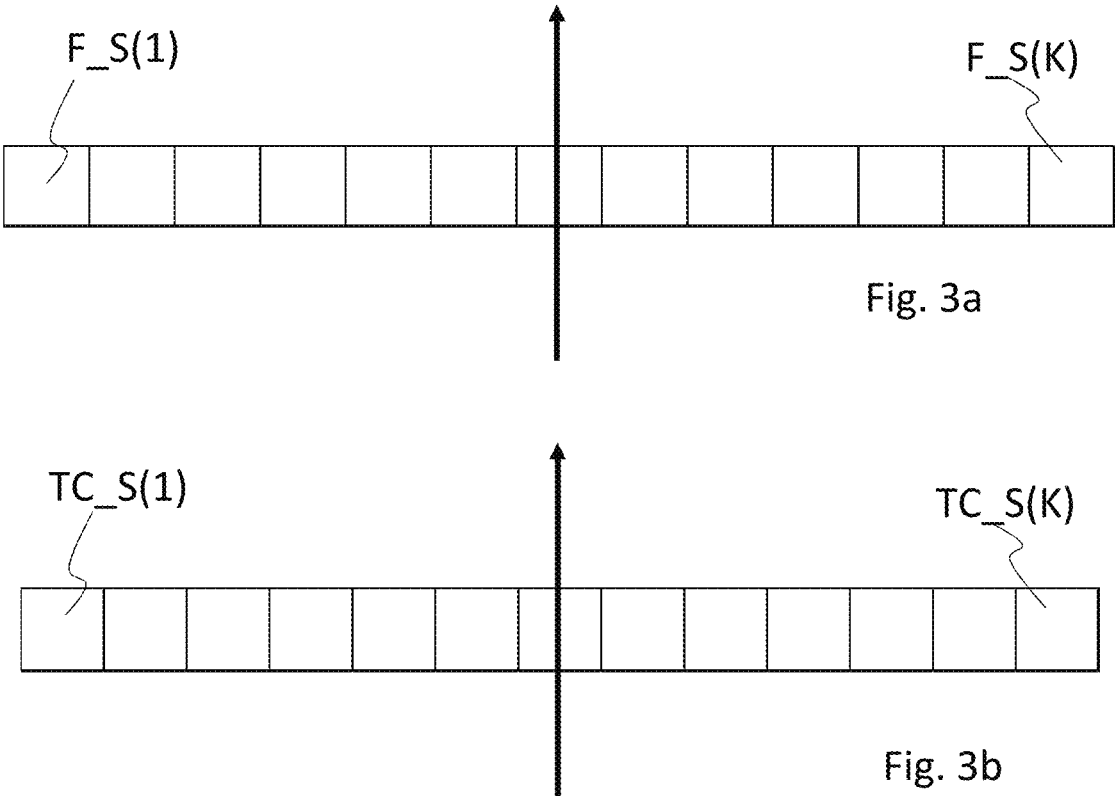
Fig. 3a
TC_S(1)
TC_S(K)
Fig. 3b
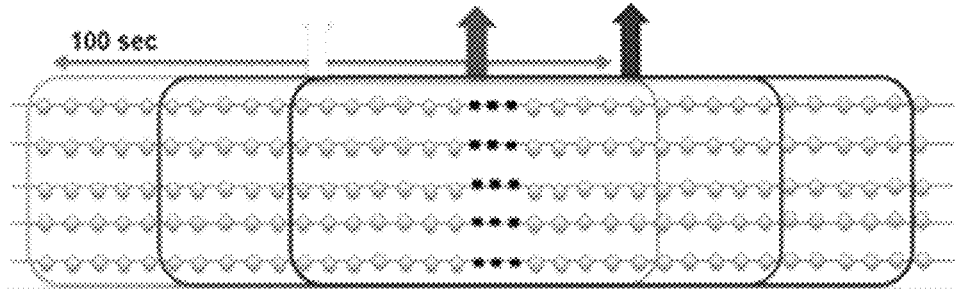
100 sec
Fig. 4

METHOD FOR DETECTING A WORK OR AGRICULTURAL VEHICLE MISSION THOUGH A NEURAL NETWORK AND CONTROL UNIT IMPLEMENTING THE METHOD

CROSS-REFERENCE TO RELATED APPLICATION

This application claims priority from and the benefit of Italian Application Serial No. 102021000000242, entitled "Method for Detecting a Work or Agricultural Vehicle Mission Though a Neural Network and Control Unit Implementing the Method," filed Jan. 7, 2021, which is hereby incorporated by reference in its entirety.

FIELD OF THE INVENTION

The present invention relates to a method for detecting a work or agricultural vehicle mission though a neural network and a control unit implementing the method.

DESCRIPTION OF THE PRIOR ART

It is well known that the same vehicle can be involved in different missions. Some missions involve a cyclical execution of a sequence of vehicle movements. In addition, in the same mission, similar movements, for example the forward movement of the vehicle, could require two different execution speeds. Indeed, while a loader is loading material with the bucket in dig position, the forward vehicle movement requires low speed and high torque. In contrast, when the vehicle should move from the loading place to the unloading place, the forward vehicle movement requires relative higher speed and lower torque.

It is clear that the vehicle driveline is designed to adapt itself to the working conditions, for example the displacement of the hydraulic motor is function of the resistant torque sensed, however the adaptation requires time, time lost in the execution of the mission and thus in vehicle productivity.

More in particular, for the construction vehicles provided with an arm/boom, the movement speed and accuracy of the arm depends on the kind of mission.

Main missions for Wheel Loader and excavators are:

Truck loading: Removing material or ground by throwing directly in a truck through a bucket;

Hauling: Carrying a load of material various distances across a jobsite through a bucket;

Pick & Place: Using the fork or the bale grabber attachment to pick and lift the material and then to place it in a destination on the ground or on a shelf;

Stock Piling: defining a stockpile through the bucket, which is a pile or storage location for bulk materials, forming part of the bulk material handling process.

The excavator differs from the loader for the fact that the arm is hinged to the cabin and both can rotate over a vertical axis over the lower portion of vehicle. Thus, the first element of the excavator arm, connected to the vehicle frame, has two degrees of freedom: swinging and tilting.

Some vehicle arms have also the possibility to extend slidingly one element of the arm, typically in a telescopic way.

Machine learning and deep learning are known concepts. The implementation of deep learning in all the fields seems will have a remarkable development. However, the deep learning requires relevant computational power and long learning period.

In the context of machine learning and, more in particular, of the supervisioned machine learning the situation is quite different. Here the elaboration means require sensibly less computation power and provides for a higher product standardization, but the most relevant hurdle is the way in which data are structured to be supplied to the neural network.

SUMMARY OF THE INVENTION

The main object of the present invention is to provide a method for training a neural network in the field of agricultural and construction vehicles in order to automatically recognize a specific vehicle mission and adapt at least one control a vehicle parameter.

The present invention is based on the observation that in general, the mission of a work or agricultural vehicle is recognized by observing at least the successions of the arm movements of the work or agricultural vehicle.

The boom or arm defines an open kinematic chain, which represents the most complex vehicle device. For example, a loader usually includes an arm, defined by a first element connected to the vehicle frame and a bucket hinged to the first element. Thus, the open kinematic chain includes two elements in a per se known fashion.

The first element can assume a first plurality of positions with respect to the vehicle frame, while the second element, for example, the bucket can assume a second plurality of positions with respect to the first element. For simplicity, the first and second position domains are discretized into contiguous segments.

The arm as whole can assume a further plurality of configurations combination of the first and second plurality of reciprocal positions. Such further plurality is named as operative configuration of the arm.

The main principle of the invention is the monitoring of the arm in order detect frequency and time duration for each operation configurations and detecting the vehicle mission as a function of the balance of said frequencies and time durations.

The frequencies and time durations are set as inputs of a neural networks previously trained and the latter is capable to detect the vehicle mission.

More in detail, the method is implemented by construing a first matrix having a number of dimensions equal to the number of degrees of freedom of the arm, wherein each cell of the matrix is assigned to a combination of segments in which the domains of the degree of freedoms are discretized and each cell is filled with the number of transitions of the arm through the corresponding operation configuration. A second matrix is construed in the same way but each cell includes the cumulative time of permanence of the arm in the corresponding operative configuration. In other words, the pairing of the two matrices permits to evaluate the reaching of certain kinematic configurations but also to evaluate whether such conditions are more stable or transitional along with the arm operation.

Based on the above statistics calculated from data collected over the field on several vehicles working in different and a priori known missions, a neural network, constituted by two layers with a calibratable number of neurons, is trained through the back-propagation algorithm in order to recognize the above-mentioned missions.

Advantageously, thanks to the training above disclosed, the neural network is trained getting at least 90% of accuracy. According to a preferred embodiment of the invention, the data are refreshed any predetermined time interval according to a sliding window strategy, such that the history is kept in consideration for the future evaluations.

The run-time identified mission is advantageously used in order to automatically adjust a vehicle parameter, for example at least one control gain of any of the vehicular actuators even those not belonging to the kinematic chain, such as the driveline, or any other actuator.

For example, a Pick & Place maneuver can be supported by smooth aggressiveness for boom and bucket, while hauling or stock piling operation can be supported by high aggressiveness. The same approach can be implemented for engine and transmission settings as better described in the detailed description. Alternatively, to an automatic self adjustment of the vehicle setting, the control unit through which the present invention is implemented can be programmed to suggest to the driver/operator the best vehicle setting to support the mission through a message on the dashboard display.

According to a preferred embodiment of the invention, the identified mission is transmitted remotely to a remote server to power fault contextualization and to support Fleet Management and maintenance Services.

Advantageously the possibility to contextualize any fault permits an easier the understanding of components involved in the fault. In addition, at the server side, the faults are correlated to the frequency of certain missions in order to better identify the critical missions and to guide vehicle design to better face such critical missions, to benefit efficiency and reliability.

According to a preferred embodiment of the invention that can be combined with any one of the previous ones, the arm behavior is adjusted to achieve the needed precision during certain activities and the needed speed during other activities.

It should be noted that the term "activity" is used instead of mission. An activity could be a mission as a whole and also a portion thereof. For example, when the vehicle is provided with a fork the adjustment of the forks height requires a certain precision, therefore the control gain should be relatively low. A moderate gain can be implemented during a load lowering in order to avoid load loss or damage. However, during load raising, the gain can be increased in order to render as fast as possible the operation.

Therefore, the neural network can recognize not only a specific mission but also can adjust dynamically the controller gains or any vehicular parameter that can be render easier and faster the vehicle operation.

According to a preferred embodiment of the invention, also the vehicle speed is accounted in order to distinguish between those missions having a similar arm behavior, such as Road clearing: Using the front attachment to remove snow or debris from roadways and Milling: using a front attachment to break down asphalt and concrete.

These and further objects are achieved by means of the attached claims, which describe preferred embodiments of the invention, forming an integral part of the present description.

BRIEF DESCRIPTION OF THE DRAWINGS

The invention will become fully clear from the following detailed description, given by way of a mere exemplifying and non limiting example, to be read with reference to the attached drawing figures, wherein:

FIG. 4 discloses the refresh of the aggregated data according to a sliding window technique;

The same reference numerals and letters in the figures designate the same or functionally equivalent parts.

According to the present invention, the term "second element" does not imply the presence of a "first element", first, second, etc. are used only for improving the clarity of the description and they should not be interpreted in a limiting way.

DETAILED DESCRIPTION OF THE PREFERRED EMBODIMENTS

Figure 1A:
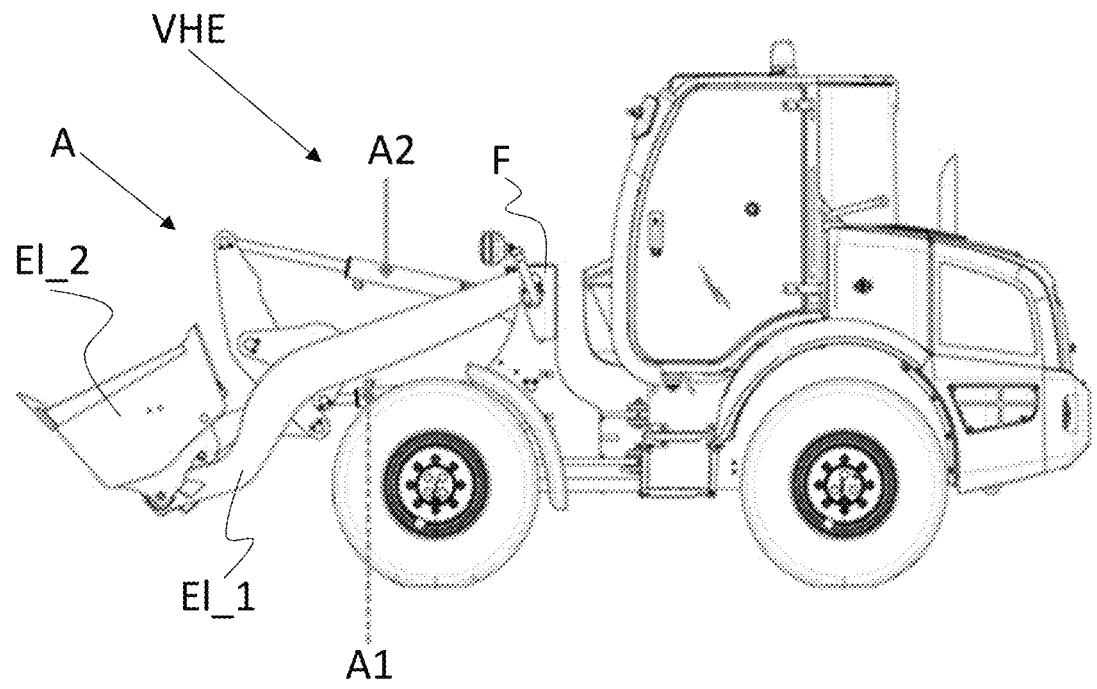
FIG. 1a shows an example of construction vehicle, in particular a wheel loader, and FIG. 1b discloses a hydraulic control circuit for controlling the arm, the bucket of the vehicle and further auxiliary hydraulic actuators.

FIG. 1a discloses a construction vehicle such as a wheel loader VHE provided with a boom or arm A including a first element E1_1, substantially elongated, hinged to the vehicle frame F and a second element E1_2, such as a bucket or a fork, hinged to the first element. More in particular, a first end of the first element is connected to the vehicle frame, while a second end, opposite to the first one, supports the second element.

It is clear that the first element can assume several inclined positions with respect to the frame F. The range of such inclinations is herewith appealed as domain.

Also the second element can assume several inclined positions with respect to the first element. The range of such inclinations is also appealed as domain.

According to the present invention, one of the theoretically infinite positions of the first element in combination with one of the theoretically infinite positions of the second element define an operative configuration.

The basic idea of the present invention is to monitor frequency and time duration for each operation configurations and detecting the vehicle mission as a function of the balance of said frequencies and time durations.

To render easily implementable the solution, the domains are segmented such that the reciprocal positions falling within one segment are assumed to be approximately in the middle of the same segment.

The segments of one element are combined with the segment of another element of the arm, such that to obtain all the possible combinations. The number of such combinations is given by the product of the number of the segments of each domain.

Figure 2A:
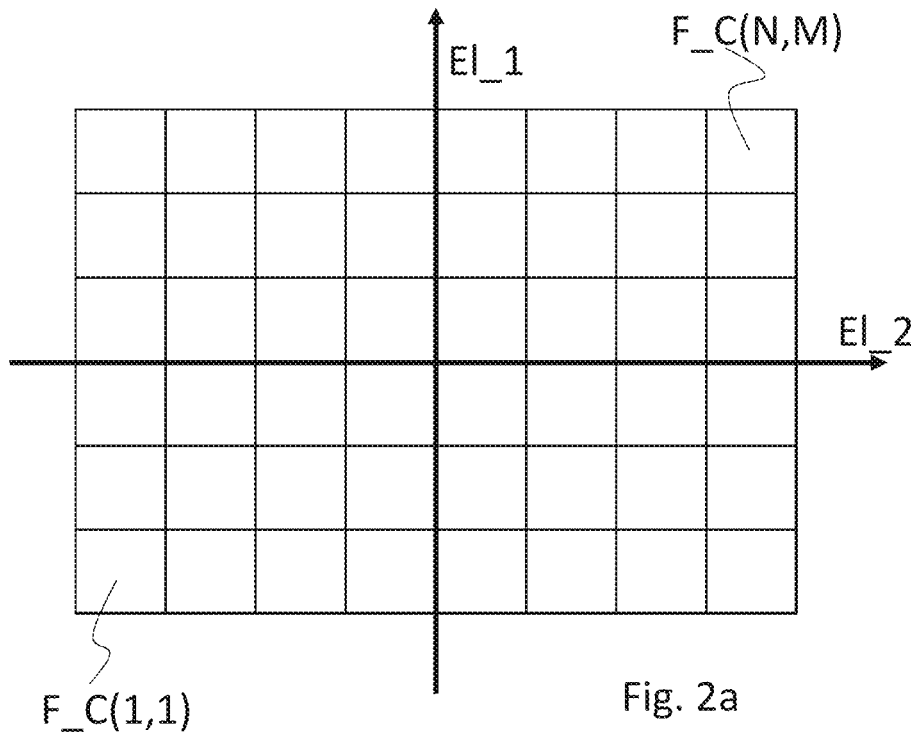
FIGS. 2a and 2b show two matrices construed on the basis of the present inventive method according to the vehicle arm disclosed on FIG. 1, FIGS. 3a and 3b show two vectors construed on the basis of a preferred embodiment of the present inventive method according to the vehicle disclosed on FIG. 1.
Figure 2B:
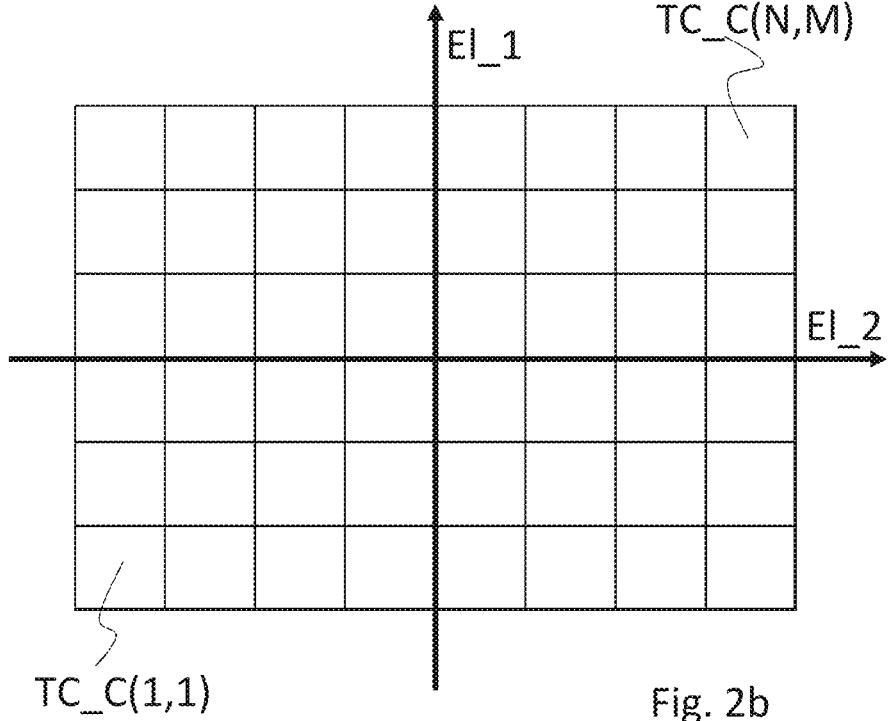

FIGS. 2a and 2b disclose matrices obtained by the application of such teaching. Each cell corresponds to an operative configuration of the arm.

In case the arm includes three elements reciprocally hinged, such as the arm of an excavator, the 2D matrices become 3D matrices.

In the same way, when the connection between two consecutive elements has two degrees of freedom, the matrices gain a further dimension.

What should be clear in mind is that each cell depict a specific and unique operative configuration. This means that no permutation can be repeated.

According to the present invention, one matrix is used to store the transitions of the arm through the various possible operative configurations. Thus, such matrix includes the frequencies for a given observation time interval.

The other matrix is used to store in each of the cells the cumulative time that, during the same observation time interval, the arm is in the corresponding operative configuration.

Preferably, the frequency and the cumulative time are expressed in relative terms. This means that each cell includes a value between 0 and 1. Indeed, while each frequency is divided per the total number of transitions among the operative configurations, the cumulative time is divided per the observation time interval.

The data aggregated in this way are supplied to neural network. In particular, each of the cells is associated to an individual input of the neural network, detailed in the following.

Such interconnection between the cells and the neural network inputs is used both during the training and during the steady state working of the neural network.

In order to avoid strong discontinuities at the inputs of the neural network, the values of the cells are refreshed every fraction of the observation time interval according to a sliding window strategy.

This means that if the observation time interval has a duration of 100 s, the refresh can be carried out, for example, every 20 s with 80 s of previously acquired data and 20 s of fresh data.

It should be considered that some missions could be further distinguished in sub-missions and the monitoring of the arm operation could be not enough to ascertain between similar missions, for example:

Road clearing: Using the front attachment to remove snow or debris from roadways and Milling: using a front attachment to break down asphalt and concrete.

In those missions, the arm is maintained substantially in the same operating conditions for long time. Therefore, it is strongly difficult to distinguish between such similar missions. For the neural network it is relatively easy to distinguish between Truck loading, Hauling, Pick & Place and Stock Piling and clearing/milling. However, when the arm is maintained in the same position further data are taken in consideration.

According to a preferred embodiment of the invention, also the vehicle travelling speed is considered.

Similarly to the aggregated data defined for the arm, two vectors are considered in order to acknowledge the transition of the travelling speed in the segments and the cumulative time of the travelling speed in a predetermined segment.

By considering that the driveline of the work and agricultural vehicle is often fully reversible, then also the rearward motions should be considered and appropriately segmented. Therefore, the vectors cover the rearward and forward travelling vehicle speeds. Also, the stationary conditions should be considered, because some missions do not require relevant vehicle moving.

For example, the excavators often are capable to perform a mission while standing still in place and swinging the cabin for moving material from a place to another place.

Preferably, the conditions where neither the vehicle moves nor the arm is in operation are automatically discarded in order to introduce noise in the data analysis.

Also in this case, each of the vector cells is associated to an input of the neural network together with the cells of the first and second matrices.

It should be considered that the domain are segmented with segments having constant or variable width.

In addition, it should be clear that the number N of segments of a domain can be different from the number M of segments of another domain.

For example, in FIGS. 2$a$ and 2$b$ the first element E1_1 has the corresponding domain segmented into six segments, while the second element E1_2 has the corresponding domain segmented with eight segments, where the first element is, for example, the boom and the second element is the bucket. According to FIG. 2$a$, "F_C" indicates Frequency of Combinations, while (x,y) indicates the individual cell of the matrix.

According to FIG. 2$b$, "TC_C" indicates Time Cumulative of Combinations.

According to FIGS. 3$a$ and 3$b$, the cells are indicated with F_S and TC_S where "S" indicates travelling Speed.

FIG. 4 discloses three observations time intervals partially overlapping in order to refresh the aggregated data every fraction of the observation time interval.

Figure 5:
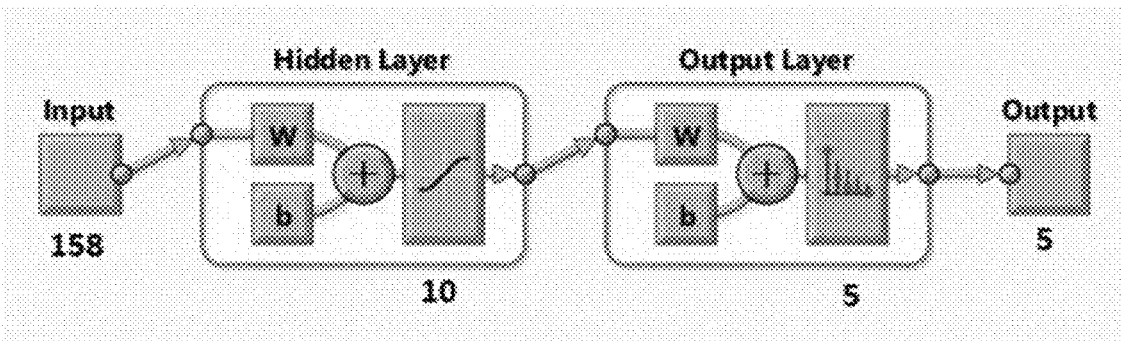
FIG. 5 discloses the neural network scheme implemented in a preferred embodiment of the present invention.
Figure 6:
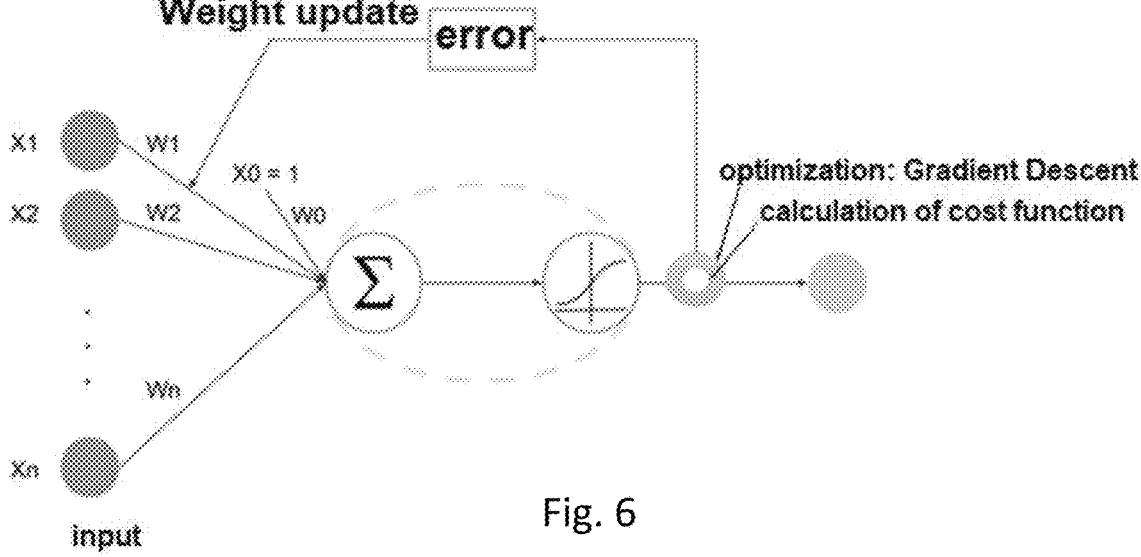
FIG. 6 discloses a training method scheme, based on the matrices disclosed in the FIGS. 2a and 2b or based on the matrices disclosed in the FIGS. 2a and 2b and the vectors disclosed in the FIGS. 3a and 3b.

FIG. 5 discloses a classical neural network scheme with input layer, hidden layer and output layer, FIG. 6 discloses a backpropagation algorithm scheme to train the neural network of FIG. 5.

It is clear that the output layer should have a number of nodes equal to the possible missions to be distinguished.

The number of inputs is equal to the sum of the number of cells of the two multidimensional matrices and possibly of the two speed vectors.

Now it is clear that the segmentation operation should be carried out considering that an excessive fragmentation of the domains lead to high number of neural network inputs with a non-significant advantages in the determination of the kind of missions.

FIG. 5 discloses also the back-propagation algorithm implemented to train the neural network.

In machine learning, backpropagation is a widely used algorithm for training feedforward neural networks. Generalizations of backpropagation exists for artificial neural networks (ANNs). In fitting a neural network, backpropagation computes the gradient of the loss function with respect to the weights of the network for a single input-output example, and does so efficiently, unlike a naive direct computation of the gradient with respect to each weight individually. This efficiency makes it feasible to use gradient methods for training multilayer networks, updating weights to minimize loss; gradient descent, or variants such as stochastic gradient descent, are commonly used. The backpropagation algorithm works by computing the gradient of the loss function with respect to each weight by the chain rule, computing the gradient one layer at a time, iterating backward from the last layer to avoid redundant calculations of intermediate terms in the chain rule; this is an example of dynamic programming.

According to a preferred embodiment, a scaled conjugate gradient algorithm for fast supervised learning has been implemented, see "A scaled conjugate gradient algorithm for fast supervised learning" Martin Fodslette Møller in Neural Networks—Volume 6, Issue 4, 1993, Pages 525-533.

In order to validate the present approach, a wheel loader has been implemented into the following five missions:

Fork Short Y Cycle (20%),

Fork Long Y Cycle (20%),

Bucket Short Y Cycle (20%),

Bucket Long Y Cycle (20%),

Other (20%) activities.

The meaning of Y cycle is clear to the skilled person in the art. It includes a front moving to get the load, a rear moving and again a front motion to reach the place where the load is released. This Y cycle can be short or long according to the position of the pick and release place of the load.

It should be clear also that the length of the cycle impacts not only on the vehicle speed by also on the time in which the load is maintained raised by the bucket or fork, therefore, the speed detection is absolutely optional even if it impacts on the accuracy of the detection.

The network includes 158 inputs, 10 hidden neurons and obviously 5 output neurons.

And the angular positions of the boom elements and of the vehicle speeds have been acquired for about 200.000 seconds in total, and 70% are used for training, 15% for validation and the remaining 15% of testing.

The above mission have been recognized with an accuracy higher than the 90%.

According to a preferred embodiment of the invention, after the segmentation of the domains, does cells whose values does not change significantly over the considered missions have been discarded in order to reduce the number of neural network inputs.

It is clear that the number of discarded cells depend on the segmentation and on the mission selection among those to be recognized.

Figure 1B:
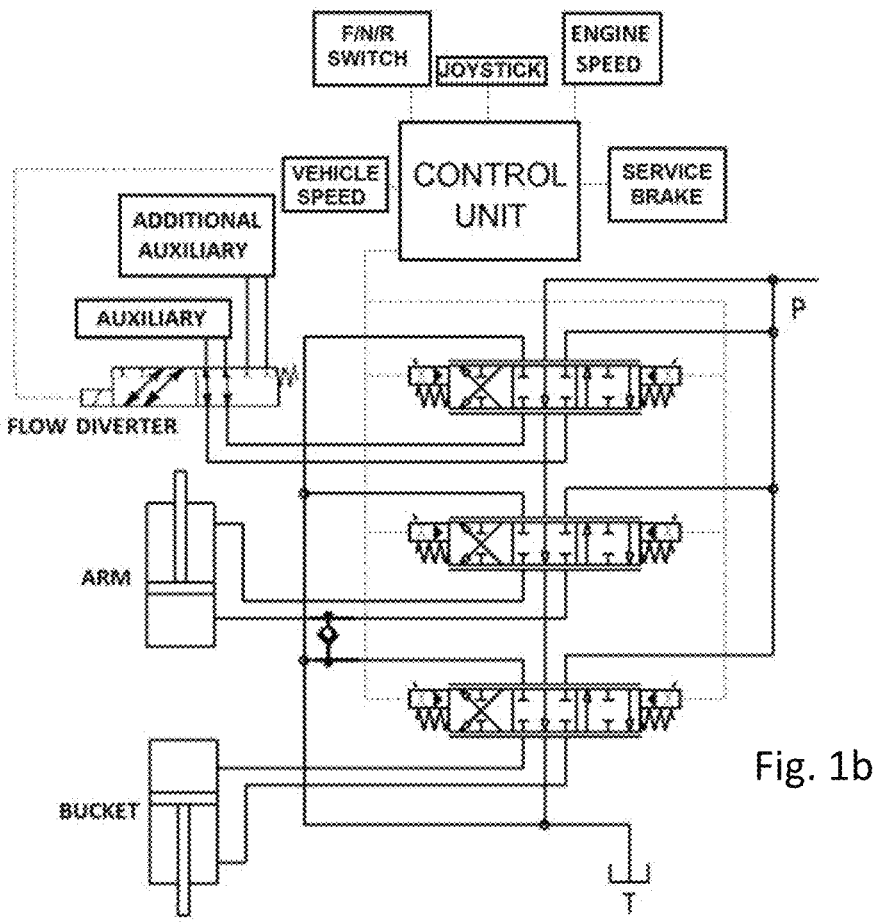

FIG. 1b discloses a hydraulic circuit to control at least the arm actuator A1 and the bucket actuator A2. The hydraulic circuit is controlled by the control unit which controls the several hydraulic valves electrically. Therefore, it means that the gains to control the valves can be varied and, consequently, the actuators responsiveness it changed.

Further actuators are not disclosed, but well known to the skilled person in the art. For example, the cabin suspensions reactivity with respect to the vehicle frame can be varied. Any of the parameters of the vehicle actuators can be subjected to manipulation on the basis of vehicle mission detection.

The labels T refers to the oil tank where the oil is discharged and P the hydraulic pump sucking oil from the tank to pressurize the actuators. The control unit CONTROL UNIT supervisions several vehicle magnitudes such as vehicle speed VEHICLE SPEED, ENGINE SPEED, JOY-STICK position, SERVICE BRAKES, forward, neutral, rearward SWITCH and the hydraulic circuit as a whole.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well known processes, well-known device structures, and well known technologies are not described in detail.

This invention can be implemented advantageously in a computer program comprising program code means for performing one or more steps of such method, when such program is run on a computer. For this reason, the patent shall also cover such computer program and the computer-readable medium that comprises a recorded message, such computer-readable medium comprising the program code means for performing one or more steps of such method, when such program is run on a computer.

Many changes, modifications, variations and other uses and applications of the subject invention will become apparent to those skilled in the art after considering the specification and the accompanying drawings, which disclose preferred embodiments thereof as described in the appended claims.

The features disclosed in the prior art background are introduced only in order to better understand the invention and not as a declaration about the existence of known prior art. In addition, said features define the context of the present invention, thus such features shall be considered in common with the detailed description.

Further implementation details will not be described, as the man skilled in the art is able to carry out the invention starting from the teaching of the above description.

The invention claimed is:

1. A method for detecting a mission of a work vehicle through a neural network, wherein the work vehicle is provided with an arm including at least two elements, a first element of the at least two elements is connected to a vehicle frame of the work vehicle, a second element of the at least two elements is connected to the first element, and the work vehicle is provided with a device configured to detect a reciprocal degree of freedom between the first element and the vehicle frame and between the second element and the first element as the arm assumes a plurality of operative configurations, the method comprising:

within an observation time interval, monitoring the arm to detect frequency and time duration for each operative configuration of the plurality of operative configurations; and detecting the mission as a function of a balance of a plurality of frequencies and time durations.

2. The method according to claim 1, wherein detecting the mission comprises supplying as inputs into the neural network a frequency of transitions of the arm through operative configurations falling in a combinations of segments, and a time cumulative persistence of the arm in operative configurations falling in the combinations of segments, wherein the combinations of segments comprises one or more discretized domains of the degree of freedom.

3. The method according to claim 2, comprising constructing a first and a second matrix, the first and the second matrix each having a plurality of dimensions equal to a number of degrees of freedom of the arm, such that each dimension in the plurality of dimensions is associated with one of the degrees of freedom of the arm, associating each cell of the first and second matrix to one of the combinations of segments, filling, based on an observation time interval during operation of the arm, each cell of the first matrix with a value for the frequency of transitions of the arm that falls inside of each combinations of segments, and filling, based on the observation time interval, each cell of the second matrix with a value of the time cumulative persistence of the arm that falls inside of each combinations of segments, wherein the value of each cell of the first and second matrix is supplied to a corresponding input of the neural network.

4. The method according to claim 1, wherein detecting the mission comprises using the neural network that is of a supervised neural network type and that is trained through a back-propagation procedure on the basis of known vehicle missions.

5. The method according to claim 3, wherein the observation time interval comprises a predetermined width and wherein the cells are updated according to a sliding time window approach.

6. The method according to claim 1, wherein the reciprocal degree of freedom is a reciprocal inclination and/or a reciprocal sliding position.

7. The method according to claim 1, comprising monitoring the work vehicle's travelling speed in a forward and in a rearward direction, in order to detect frequency and time duration, within an observation time interval, of predetermined travelling conditions.

8. The method according to claim 7, comprising discretizing domains of forward and rearward speeds by defining a plurality of segments for a speed domain, each segment defining a travelling condition, and supplying as inputs into the neural network a time cumulative persistence of the work vehicle in the speeds falling in the segments and a frequency of transitions of the work vehicle's speed in the segments, wherein detecting the mission comprises using the neural network.

9. The method according to claim 8, comprising constructing a first vector and a second vector comprising a plurality of cells associated with the work vehicle's speed by considering positive and negative speeds according to a forward and rearward travel direction, associating each cell of the plurality of cells to discretized vehicle speeds from a maximum negative speed to a maximum positive speed including a segment associated to a work vehicle stationary condition, filling, based on an observation time interval, each cell of the first vector with a number of transitions of the vehicle speed in the speed range associated with the cell of the first vector, filling, based on the observation time interval, each cell of the second vector with a cumulative time persistence of the vehicle speed in the speed range associated with the cell of the second vector, wherein a value of each cell of the first and second matrix and of the first and second vectors is supplied to a corresponding input of the neural network.

10. The method according claim 9, wherein the observation time interval has a predetermined width and wherein the cells are updated according to a sliding window at a predetermined fraction of the observation time interval.

11. The method according to claim 3, wherein cells whose value variation discloses low sensitivity to the mission are disregarded without being supplied as input of the neural network.

12. The method according to claim 1, comprising adjusting a vehicle actuator parameter on the basis of the mission detected and/or the signaling to a driver of a preferred setting of the vehicle actuator parameter.

13. The method according to claim 1, comprising sending a failure signal together with the mission to a remote server.

14. A non-transitory computer comprising computer-executable instructions that, when executed by one or more processors, cause the one or more processors to:

execute a process for detecting a mission of a work vehicle through a neural network, wherein the work vehicle is provided with an arm including at least two elements, a first element of the at least two elements is connected to a vehicle frame of the work vehicle, a second element of the at least two elements is connected to the first element, and the work vehicle is provided with a device configured to detect a reciprocal degree of freedom between the first element and the vehicle frame and between the second element and the first element as the arm assumes a plurality of operative configurations, the process comprising:

within an observation time interval, monitoring the arm to detect frequency and time duration for each operative configuration of the plurality of operative configurations; and detecting the mission as a function of a balance of a plurality of frequencies and time durations.

15. A work vehicle comprising:

an arm including at least two elements, wherein a first element of the at least two elements is hinged to a vehicle frame of the work vehicle, and a second element of the at least two elements is hinged to the first element; and a controller configured to detect a reciprocal inclination between the first element and the vehicle frame and between the second element and the first element as the arm assumes a plurality of operative configurations, the controller configured to use a neural network to detect frequency and time duration for each operative configuration of the plurality of operative configurations within an observation time interval and to detect a mission of the work vehicle as a function of a balance of a plurality of frequencies and time durations.

* * * * *